Figure 1:
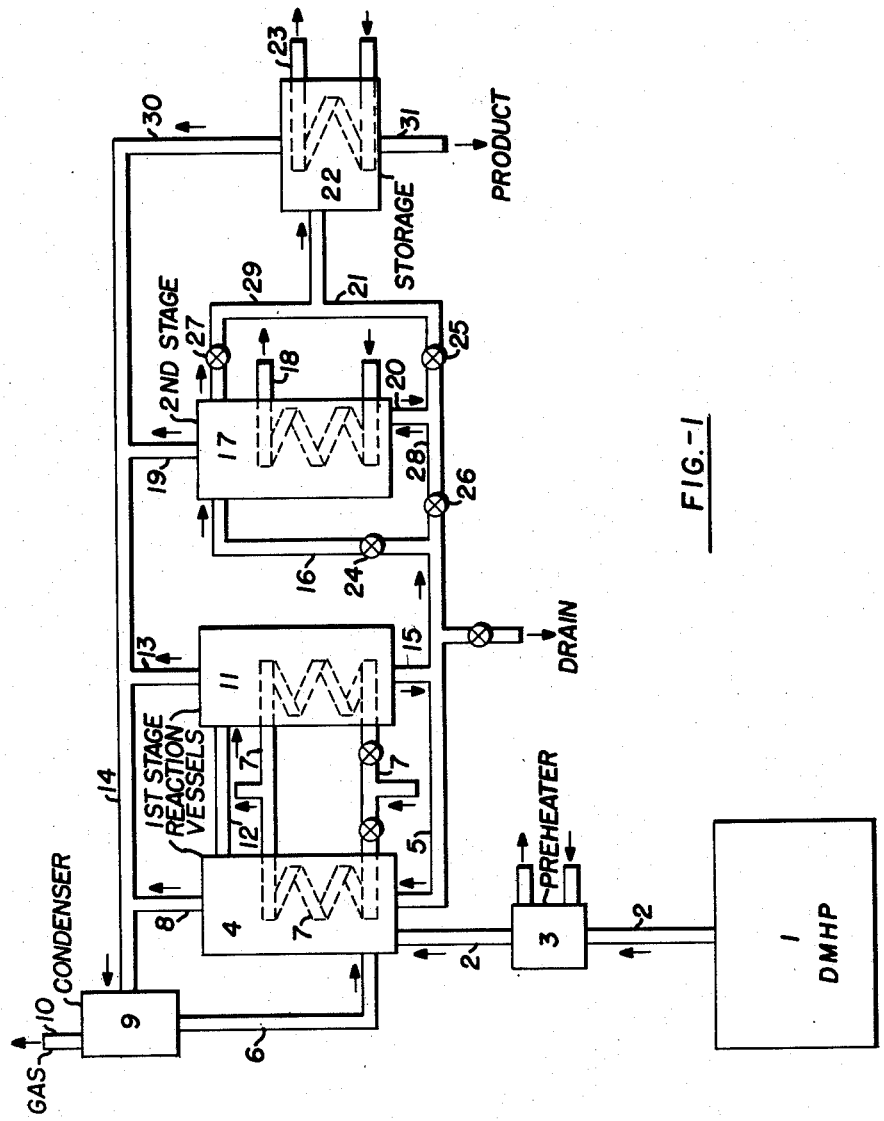

Leland K. Beach
James E. Shewmaker   Inventors

By *Henry Berl*   Attorney

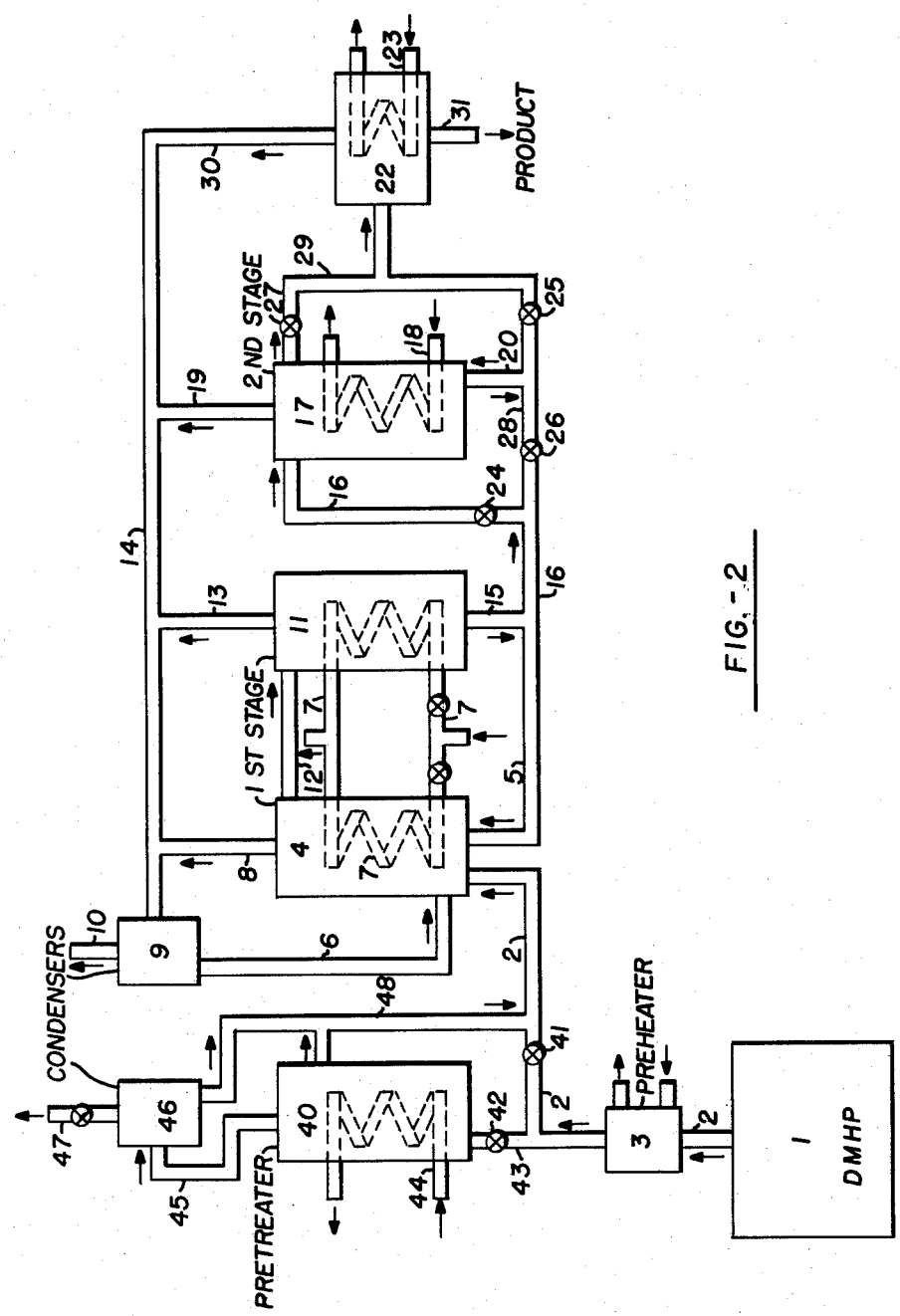
Leland K. Beach
James E. Shewmaker   Inventors

United States Patent Office 3,093,673
Patented June 11, 1963

3,093,673
PROCESS FOR MAKING PHOSPHONATES
Leland K. Beach, Westfield, and James E. Shewmaker, Fanwood, N.J., assignors to Esso Research and Engineering Company, a corporation of Delaware
Filed June 8, 1961, Ser. No. 116,919
4 Claims. (Cl. 260—461)

This invention relates to a process for converting pure or crude dimethyl hydrogen phosphite, i.e. DMHP, to methane phosphonic acids, anhydrides, and their methyl esters, i.e. so-called "utilizable phosphorus," by partially pyrolyzing the phosphite in one stage and completing the pyrolysis in another stage at a higher different temperature.

This is a continuation-in-part of Serial No. 563,254 filed February 3, 1956, now abandoned.

Useful products containing the methane phosphonic acid structure, that of its simple esters or its anhydrides can be made by pyrolysis of dimethyl hydrogen phosphite at temperatures in the range of 150° to 350° C. in a batch or continuous operation with or without catalysts or modifiers. DMHP is usually prepared from phosphorus trichloride with methanol. The reaction product generally contains about 50 to 85 wt. percent DMHP.

Conventionally, the pyrolysis of the phosphite is carried out on a commercial scale in a continuous manner involving three vessels all at essentially the same temperature. By that method, the substantially pure phosphite feed is passed into a first vessel and the reaction mixture product from the first vessel is passed into a second vessel. A portion of the reaction mixture from the second vessel is recycled to the first vessel and the remaining portion is passed into a third vessel called a finisher. Temperatures of about 250° to 260° C. have been used in these three vessels and a total residence time of three hours, more or less, has been employed. Under these conditions, the maximum yields of methane phosphonates obtainable were 76-77 mole percent, based on distilled DMHP feed, at conversion of 99 to 100% of the trivalent phosphorus in the feed. The term "trivalent phosphorus" includes DMHP, monomethyl hydrogen phosphite, phosphorous acid and other phosphorus compounds that can be hydrolyzed with strong mineral acids to give phosphorous acid.

It has now been discovered that improved yields of methane phosphonates are obtained by using a continuous or batch unit having two different temperature stages. The process has been successfully employed to make useful phosphonates from crude DMHP as well as pure material. The crude (undistilled) material consists of about 60 to 85 wt. percent DMHP, the balance being principally monomethyl phosphite and phosphorous acid. It has been found that if the crude feed is not pyrolyzed in stages excessive amounts of undesirable by-products, especially phosphates, are formed. However, by effecting about 50 to 80 or up to 95% conversion of the trivalent phosphite at temperatures below 250° C. and thereafter completing the conversion at temperatures of 250° to 350° C., better yields and more useful products are obtained.

In carrying out the present invention, the temperatures in the first reaction stage are maintained between about 180° to 240° C., preferably 215° to 235° C. The second stage of the reaction is effected at 250° to 350° C., preferably 290° to 320° C. It is highly beneficial to employ temperatures substantially below 250° C. in the first stage of the reaction. For example, in a three-vessel system having two temperature stages, a temperature of about 215° C. should be used in the first two vessels (first stage) and a temperature of about 312° C. should be employed in the third vessel (second stage). The results of this improved continuous process are compared with those obtained by earlier conventional method in the table.

TABLE

| Feed run | 95+ percent DMHP | Crude (85%) DMHP | | | | |
|---|---|---|---|---|---|---|
| | A | B | C | D | E | F [1] |
| Approximate total residence time, hrs.: | | | | | | |
| First stage | 2 | 2 | 2 | 2.5 | 2 | 42 |
| Second stage | 1 | 1 | 1 | 1.5 | 1 | 2.5 |
| Temperature, ° C.: | | | | | | |
| First two vessels, first stage | 252 | 265 | 235 | 215 | 182 | 181 |
| Third vessel, second stage | 252 | 268 | 295 | 312 | 315 | 250 |
| Phosphite conversion, mole percent [2] | 96 | 98 | 99 | 99 | 99 | 99 |
| Utilizable phosphorus in product, mole percent [3] | 77 | 75 | 78.1 | 80.5 | 76.8 | 84 |
| Tetramethyl phosphonium compound in product, mole percent | 4.2 | 5.0 | 4.2 | 3.2 | 4.0 | |
| Phosphite conversion in first stage, mole percent | Ca. 90+ | Ca. 90+ | 90 | 69 | 20 | 94 |

[1] Batch process.
[2] Total trivalent phosphorus converted.
[3] Compounds containing the structure,

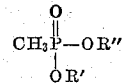

where R' and R" are selected from the class consisting of H, CH₃ or another phosphorus group.

The data in the table are for a system in which each of the three vessels has essentially the same volume and is at atmospheric pressure. Run A was carried out on a distilled or substantially pure dimethyl hydrogen phosphite. Run A represents a typical conventional operation operation as mentioned earlier. It is significant in run A that the utilizable phosphorus yield was 77 mole percent. Run B represents the conventional type operation applied to a crude undistilled dimethyl hydrogen phosphite feed. Run B gave a yield of 75%. The operation represented by runs C, D, E, and F are in accordance with the improved method of the present invention for this particular apparatus, such as used with the conventional method. It is significant that a substantial improvement in yields (5.5 to 9 mole percent) is obtained under the conditions in runs D and F, i.e. where a relatively lower temperature is utilized in the first stage and a high temperature is used in the second stage. These data are surprising because a smaller yield was obtained with pure material in the prior art process (run A). Moreover, the quantity of phosphate by-products formed in run B was about 30% greater than that formed in run D and about 50% more than the amount of phosphate made in run F. This is an important advantage because phosphates greatly increase the chlorine and phosphorus trichloride requirements in subsequent reactions that are effected to make other useful products. This is illustrated by the following equations which compare the reactions of a phosphonate and a phosphate with chlorine and phosphorus trichloride.

(1) $CH_3PO(OR)_2 + 2PCl_3 + 2Cl_2 \rightarrow$
$CH_3POCl_2 + 2POCl_3 + 2RCl$ (2) $(RO)_3PO + 3PCl_3 + 3Cl_2 \rightarrow 4POCl_3 + 3RCl$ Equation (2) demonstrates that substantial amounts of costly reactants are lost where the pyrolysis product contains large quantities of phosphates. The present process significantly reduces phosphate formation and therefore makes the product more satisfactory for further reaction.

The temperature employed in the two stages will, of course, vary with the residence times. For example, by increasing the residence time of the first stage from a few hours to 42 hours and lowering the reaction temperature of the first stage to about 180° C. until about 95% of the trivalent phosphorus is converted, then increasing the residence time of the second stage from 1 to 2.5 hours and maintaining the reaction temperature of the second stage at 250° C., until the conversion is essentially complete, the yield of desired phosphonate is increased to 84 mole percent (run F). This run illustrates that the use of relatively low temperatures in the first stage increase the yields even more. A disadvantage to such a process is the long residence time. It is generally preferred to effect the first stage of the reaction at moderately high temperatures, i.e. 215° to 235° C. for about an hour to 3 hours, and then carry out the second stage at a substantially higher temperature, i.e. 290° to 320° C., for 1 to 2 hours. Run D in the table demonstrates an operation which employs these more practical residence periods.

The data in the table have been confirmed and even higher yields, have been obtained in actual plant operation with two temperature stages.

The yield figures in the table are significant and therefore the differences are not attributable to experimental error, but rather to an actual improvement. By using a crude DMHP and a two temperature stage process, the yield based on the PCl₃ required to produce the DMHP feed can be increased 25% relative to the conventional process using distilled DMHP and only one temperature. This is a substantial savings in view of the costs of the raw materials. Furthermore, as mentioned above, less undesirable by-products are formed.

It is to be understood that in the improved stagewise operation in which different temperatures are used, catalysts, modifiers and promoters may be used. These include BF₃ catalyst and methyl donors, such as mono-, di-, or trimethyl phosphate.

The continuous staged operation described is illustrated in conjunction with FIG. 1 of the drawing.

FIG. 2 shows a modification of the apparatus shown in FIG. 1 with the addition of a pretreating unit.

Referring to FIG. 1, a pure or crude DMHP (dimethyl hydrogen phosphite) feed is pumped from storage tank 1 through feed line 2 through a preheater 3 into the bottom of the first vessel 4 where the feed is mixed with recycle from lines 5 and 6. The resulting mixture is passed up through vessel 4 in the desired period of time while held at a temperature of 180° to 240° C. by cooling means, e.g. jacket or coils 7. The evolution of dimethyl ether and phosphite conversion products tends to carry entrainment into vapor line 8 which leads the vapor into a cooling condenser 9 whence condensate with entrained liquid is returned via line 6. Uncondensed gases are removed overhead from condenser 9 by line 10. The gas evolution in vessel 4 causes liquid overflow to the second vessel 11 by line 12. The temperature of the second vessel, which is substantially the same as that of the first vessel, is controlled by heat transfer coils or jacket system 7. The liquid mixture flows downwardly through the second vessel 11. Gases are withdrawn through the overhead line 13 to be sent by the vapor manifold 14 to the condenser 9. A portion of the liquid withdrawn from a bottom part of the second vessel 11 through line 15 is recycled by line 5 to the first vessel. A remaining part of the liquid product withdrawn from the second vessel 11 through line 16 is passed by line 16 to the third vessel or finisher 17 where the liquid reaction mixture is to be held at a substantially higher temperature, e.g. 290° to 320° C., than the temperature in the first stage vessels. Cooling means 18, such as internal or external coils or jackets are provided for the third vessel 17. Gases are withdrawn overhead from the third vessel 17 by line 19 to the vapor manifold 14 for return to the condenser 9. The liquid reaction mixture flows downwardly in the finishing vessel 17 to be withdrawn at the bottom thereof by line 20 which is connected by line 21 to a heated storage tank 22, the storage tank 22 is equipped with a heating means 23, such as coil or jacket. By closing valves 24 and 25 in lines 16 and 21 respectively, and opening valves 26 and 27 in lines 28 and 29 respectively, the liquid is passed from the second vessel 11 into a bottom part of the third vessel or finisher 17 via line 20 for upflow therethrough to be removed via line 29 at an upper level from vessel 17 to the storage vessel 22. A gas vent 30 leads gaseous material from the vessel 22 into the vapor manifold 14. The liquid product is withdrawn from the receiving vessel 22 by line 31.

In all the reaction vessels, dimethyl ether is evolved to greater or lesser extent, most of it being evolved in the first stage vessel 4. Thus, as some of the DMHP is vaporized and entrained in the dimethyl ether this DMHP is recovered in condenser 9 to be returned by line 6.

It is desirable to reduce the amount of gas which is evolved in the first reactor 4. This is advantageously accomplished by placing a pretreater 40 between the preheater and the reaction vessel 4 as shown in FIG. 2 on the alternate feed line 43. To use the pretreater, the valve 41 in line 2 would be closed and valve 42 would be opened to make the feed pass through the pretreater 40. The pretreater 40 receives the DMHP feed from line 43 after it has passed through the preheater 3 with valve 42 open. The preheated DMHP enters at the bottom part of the pretreater 40 which is a vessel similar to the reaction vessels in having a cooling means 44 for removing heat. In the pretreater 40, about 50% of the DMHP is converted and about 50% of the ether is evolved even though the pretreater residence time is only about 25% of the total residence time for the process. The pretreater can be operated at atmospheric or higher pressure and at temperatures close to or below those used in the first reaction vessel 4.

The vapors evolved in the pretreater are taken overhead through line 45 to the pretreater condenser 46 where the vapors are cooled so that DMHP becomes condensed and separated from the remaining dimethyl ether gas. The ether gas is withdrawn from condenser 46 by line 47. The condensed DMHP is passed to the liquid feed line 2 by line 48. The pretreating of flow liquid in the pretreater 40 is forwarded through line 2 to the first reactor vessel 1. As an example of the use of the pretreater, DMPH was preheated in a particular run to a temperature of 220° C., i.e. in the range of 150° to 240° C. and preferably 220° to 240° C., then held in the pretreater for a period of 25 minutes at 10 p.s.i.g. The average residence in the pretreater may be from 5 to 60 minutes under a pressure of 1 to 2 atmospheres. In the particular operation at 220° C. the volume of liquid in the pretreater was about 20 to 30% of the total process liquid volume. In this particular operation about 50% of the total ether evolved in the process was taken off from the pretreater where about 50% of the DMHP was converted. Thus, the liquid which was passed from the pretreater into the vessel 4 had a relatively low DMHP partial pressure which greatly reduced the load on condenser 9 attached to vessel 4. The net result is that by adding a pretreater which increases the liquid volume capacity of the apparatus by about 33% of the throughput is just about doubled. At the same time the pretreater improves the yield by increasing the residence period during the first stage.

While theories exist regarding the mechanism of DMHP pyrolysis it should be clear that the efficiency of this last mode of operation could not be predicted from the also-unpredicted results obtained in described processes. It is evident that, in general, the technique of pyrolyzing DMHP in two or more different temperature stages is advantageous. In view of the results it appears that selectivity or efficiency of the last stage of DMHP pyrolysis is relatively insensitive to conditions whereas the selectivity of the first stage is sensitive to temperature, etc.

The essence of the invention is the discovery that when effecting the last 5 or 20%, to 50% of the conversion of trivalent phosphorus at temperatures of 250° C., and higher, e.g. 290° to 315° C., improved results are obtained when the first stage is carried out at a substantially lower temperature, i.e. at least 20° C. and preferably 50° to 100° C. below the temperature used in the second stage. Also, improved results are obtained by using moderate pressures, up to 50 p.s.i.g., in the first or low temperature stage; whereas pressures of 1 to 5 p.s.i.g. are sufficient in the second stage.

For the sake of brevity, the desired pyrolysis products are herein termed phosphonates and methane phosphonates. The products contain the phosphorus in utilizable form, as in the methane phosphonic acid structure. They can be employed as lubricant additives or used to prepare insecticides according to known methods (Synthetic Insecticides, J. Schrader, British Intelligence Objectives Report No. 1808). They are also useful as chemical intermediates in a variety of processes.

What is claimed is:

1. A continuous process for making phosphonates which comprises heating crude dimethyl hydrogen phosphite, undistilled material consisting of about 60 to 85 wt. percent of dimethyl hydrogen phosphite, the balance being monomethyl phosphite and phosphorous acid, in a first reaction zone at about 180° to 240° C. until up to 95% of the phosphite has been pyrolyzed and thereafter passing the partially pyrolyzed phosphite to a second reaction zone and heating the partially pyrolyzed phosphite at a substantially higher temperature in the range of 250° to 350° C. in said second reaction zone until the pyrolysis is complete.

2. Process according to claim 1 in which the partially pyrolyzed phosphite is heated at about 290° to 320° C. in said second reaction zone.

3. A continuous process for making methane phosphonates which comprises heating crude dimethyl hydrogen phosphite, undistilled material consisting of about 60 to 85 wt. percent of dimethyl hydrogen phosphite, the balance being monomethyl phosphite and phosphorous acid, in a first reaction zone at about 215° to 235° C. until about 50 to 80% of the phosphite has been pyrolyzed and thereafter passing the partially pyrolyzed phosphite to a second reaction zone and heating the partially pyrolyzed phosphite in said second reaction zone at about 290° to 320° C. until the pyrolysis is complete.

4. A continuous process for making methane phosphonate which comprises heating crude dimethyl hydrogen phosphite, undistilled material consisting of about 60 to 85 wt. percent of dimethyl hydrogen phosphite, the balance being monomethyl phosphite and phosphorous acid, in a first reaction zone at about 215° to 235° C. for about 1 to 3 hours to partially pyrolyze the phosphite and thereafter passing the partially pyrolyzed phosphite to a second reaction zone and heating the partially pyrolyzed phosphite in said second reaction zone at about 290° to 320° C. for about 1 to 2 hours to complete the pyrolysis.

References Cited in the file of this patent
UNITED STATES PATENTS

| 2,863,900 | Beach et al. | Dec. 9, 1958 |
| 2,923,729 | Hardy | Feb. 6, 1960 |